United States Patent [19]
DeRoche et al.

[11] Patent Number: 5,388,932
[45] Date of Patent: Feb. 14, 1995

[54] CUTTING INSERT FOR A MILLING CUTTER

[75] Inventors: Kenneth G. DeRoche, Cary; Howard J. McCreery, Raleigh, both of N.C.; Robert Jauch, Usingen-Wernborn, Germany

[73] Assignee: Kennametal Inc., Latrobe, Pa.

[21] Appl. No.: 120,713

[22] Filed: Sep. 13, 1993

[51] Int. Cl.$^6$ .................. B23C 5/20; B23C 5/10
[52] U.S. Cl. ....................... 407/113; 407/114
[58] Field of Search ................. 407/42, 113, 114

[56] References Cited

U.S. PATENT DOCUMENTS

| | | | |
|---|---|---|---|
| 3,818,562 | 6/1974 | Lacey | 407/40 |
| 4,597,695 | 7/1986 | Johnson | 407/113 |
| 4,681,488 | 7/1987 | Markusson | 407/114 |
| 4,934,878 | 6/1990 | Plutschuck et al. | 407/42 |
| 5,052,863 | 10/1991 | Satran | 407/113 |
| 5,071,292 | 12/1991 | Satran | 407/116 |
| 5,078,550 | 1/1992 | Satran et al. | 407/34 |

Primary Examiner—William E. Terrell
Attorney, Agent, or Firm—James G. Porcelli

[57] ABSTRACT

The present invention relates to a cutting insert for a milling cutter. The cutting insert includes a main body having a top face and at least one elevated corner nose area formed on the top face. Extending around the elevated corner nose area and along an adjacent side face of the cutting insert is a cutting edge. The elevated corner nose area includes an angled chamfer that intersects with the cutting edge and a flat surface disposed inwardly of the angled chamfer. A pair of tapered lands extend from the flat surface toward a respective side face of the cutting insert where each of the tapered lands intersect with the cutting edge.

16 Claims, 4 Drawing Sheets

CUTTING INSERT FOR A MILLING CUTTER

FIELD OF THE INVENTION

The present invention relates to tooling and more particularly to a cutting insert for a milling cutter.

BACKGROUND OF THE INVENTION

A milling cutter typically comprises a cylindrical cutter body having a plurality of circumferentially spaced insert seats disposed about the cutting end of the milling cutter body. A cutting insert is secured within each circumferentially spaced insert seat. Each cutting insert includes at least one cutting edge or surface that extends around an outer lower nose corner and along an adjacent side face of the cutting insert. By rotatively driving the milling cutter body, slots and shoulders can be conveniently milled into a workpiece.

Cutting inserts used in milling operations assume many varied shapes and topographies. This is because by selectively shaping the cutting insert, one can favorably influence the performance of the cutting insert.

In arriving at a design or geometry for a milling type cutting insert, there are a number of factors that should be considered. First, a geometry that reduces cutting forces while reducing horsepower requirements is desirable. By reducing cutting forces, wear and breakage will be minimized and the life of the cutting insert will accordingly be improved. Secondly, it is important that the geometry of the cutting insert impart strength to the overall main body of the cutting insert. Finally, the geometry of the cutting insert can effect the final quality of the finished mill surface of the workpiece.

SUMMARY AND OBJECTS OF THE INVENTION

The present invention presents a cutting insert for a milling cutter that is designed to optimize strength and life while at the same time providing a geometry that reduces power consumption. In particular, the milling cutter insert of the present invention includes a cutting edge that curves around an elevated corner nose area formed on the top face of the cutting insert. From the elevated corner nose, the cutting edge is inclined downwardly along an adjacent side face of the cutting insert. The top topography of the corner nose area includes an angled chamfer which intersects with the curved cutting edge. Disposed generally inwardly of the angled chamfer is a flat surface. Extending from the flat surface are a pair of tapered lands. Each tapered land extends from a selected area of the flat surface to an adjacent side or end face of the cutting insert where the tapered land intersects with the cutting edge as the cutting edge extends away from the angled chamfer and away from the elevated corner nose.

It is therefore an object of the present invention to provide a milling cutting insert design that reduces power consumption and imparts strength and increased life to the cutting insert.

Another object of the present invention is to provide a milling cutter insert with a geometry that lends itself to providing an efficient positive rake angle when the cutting insert is secured within a milling cutter body.

Other objects and advantages of the present invention will become apparent and obvious from a study of the following description and the accompanying drawings which are merely illustrative of the invention.

DETAILED DESCRIPTION OF THE INVENTION

Figure 1:
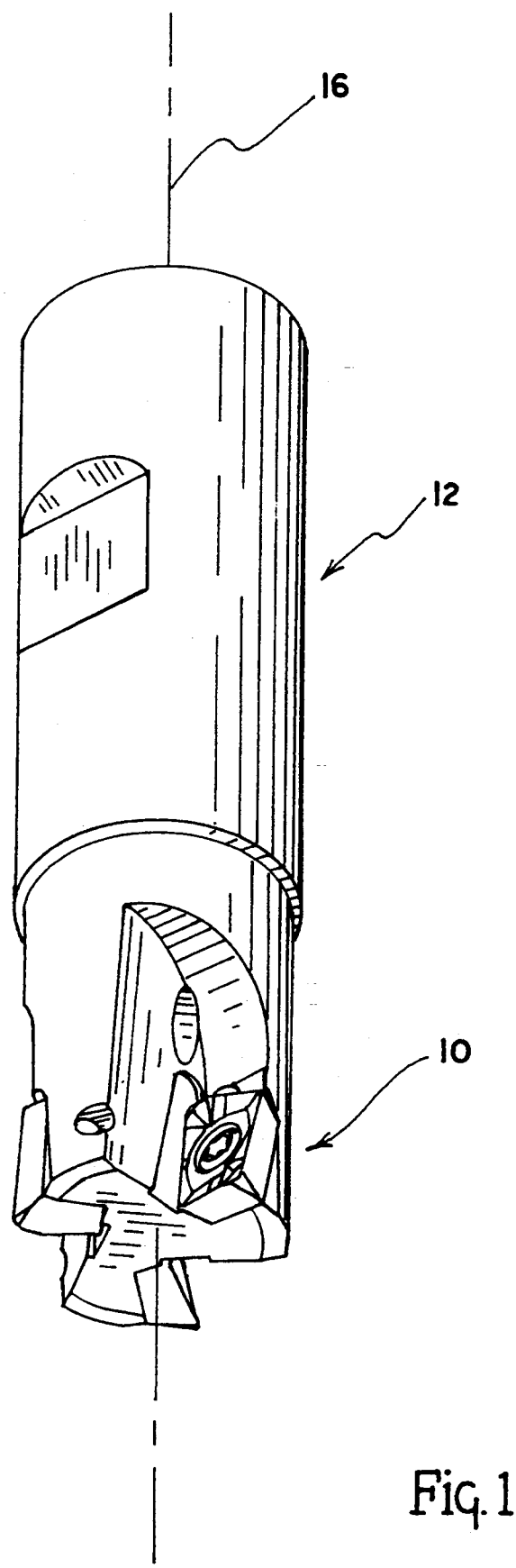
FIG. 1 is a perspective view of a milling cutter body having the cutting insert of the present invention secured thereto.

With further reference to the drawings, the milling cutting insert of the present invention is shown therein and indicated generally by the numeral 10. In conventional fashion, milling cutting insert 10 is designed to be mounted within a rotating milling cutter body indicated generally by the numeral 12. As shown in FIG. 1, the milling cutter body 12 includes a plurality of circumferentially spaced insert seats 14 formed around the cutting end of the milling cutter. Milling cutter body 12 is designed to be rotatively driven about a major axis represented by center line 16. When mounted within milling cutter body 12, it is appreciated that the cutting insert 10 cuts along an edge that extends along an outer side face of the cutting insert and which curves around an outer lower corner of the insert. Thus, as the milling cutter body 12 is rotatively driven, the cutting insert 10 acts to engage a workpiece.

Figure 2:
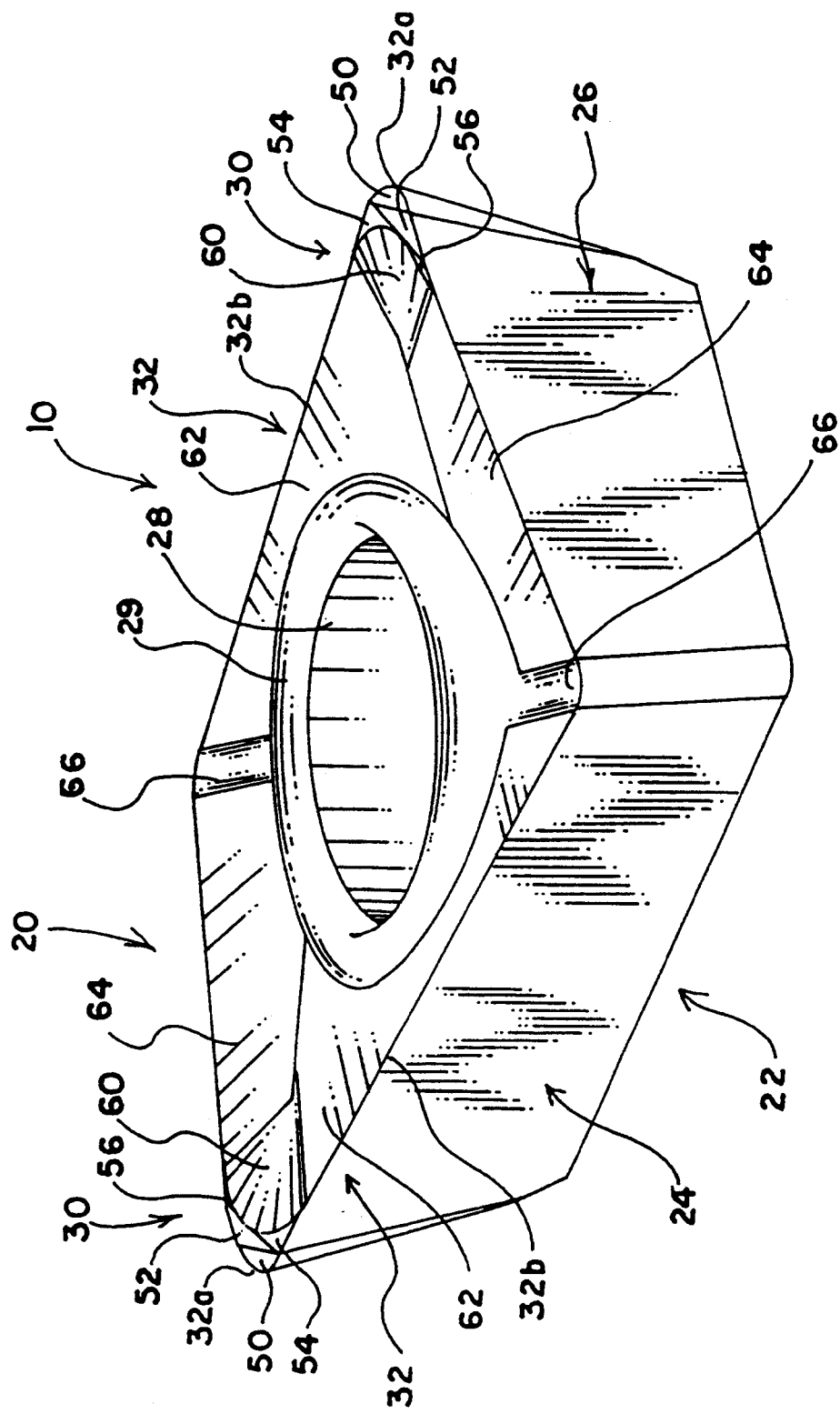
FIG. 2 is a perspective view of the cutting insert of the present invention.
Figure 3:
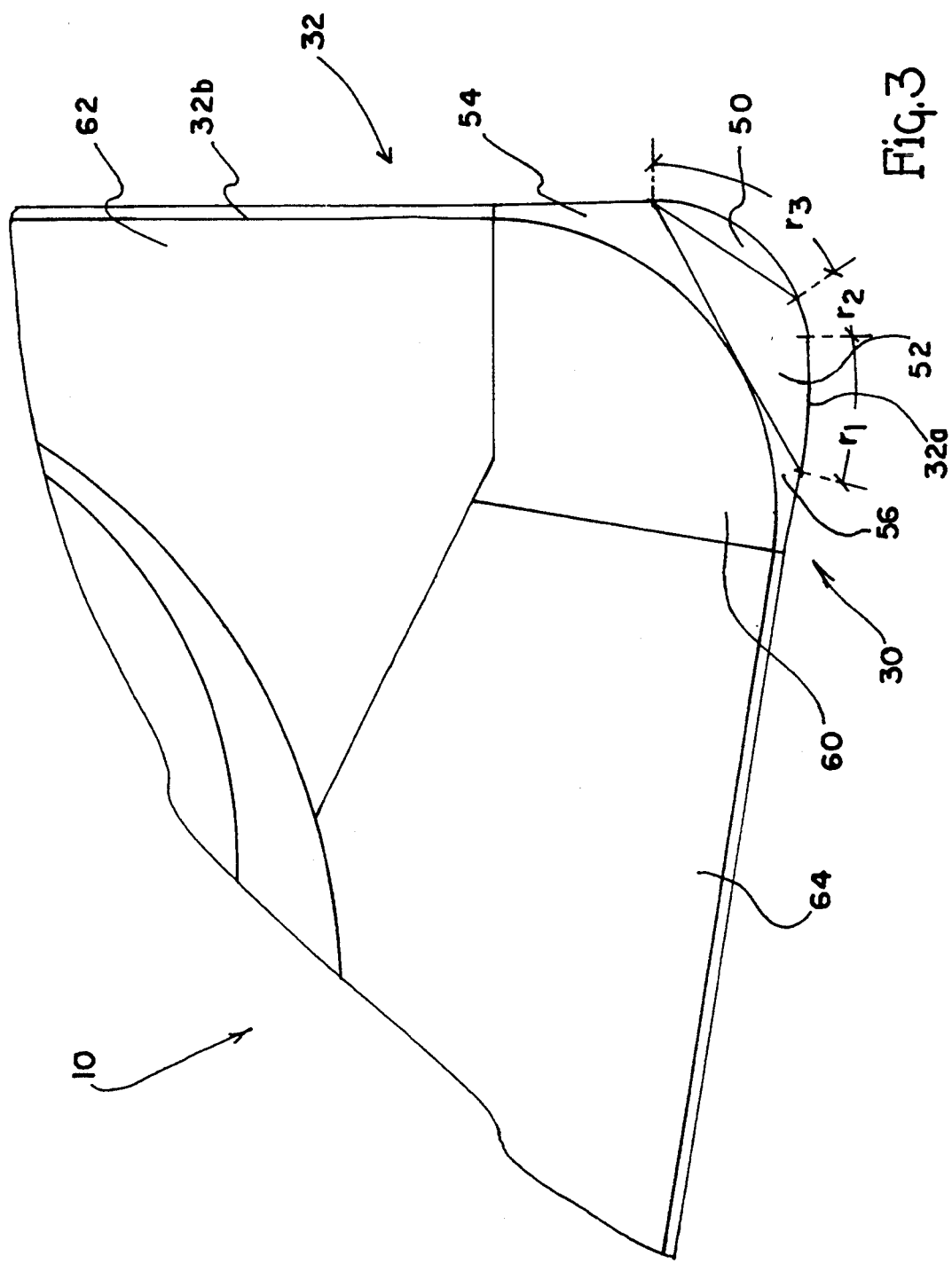
FIG. 3 is a fragmentary plan view of the elevated corner nose portion of the cutting insert shown in FIG. 2.

Now, turning to the cutting insert 10 of the present invention and particularly to FIGS. 2 and 3, it is seen that the cutting insert of the present 10 invention includes a top face indicated generally by the numeral 20, a bottom face indicated generally by the numeral 22, a pair of opposed side faces indicated generally by the numeral 24, and a pair of opposed end faces indicated generally by the numeral 26. To secure cutting insert 10 within the insert seat 14 of the milling cutter body 12, the cutting insert 10 is provided with a central opening 28 that extends downwardly through the central portion of the cutting insert. Surrounding the central opening 28 about the top surface 20 is a raised collar indicated by the numeral 29.

Formed about the top face 20 are a pair of elevated corner nose areas indicated generally by the numeral 30. As seen in the drawings, these elevated corner nose areas 30 are opposed to each other and are essentially divided or separated by the central opening 28. Extending around each elevated corner nose area 30 and along an adjacent side face is a cutting edge indicated generally by the numeral 32. It is appreciated from the drawings that the cutting insert 10 disclosed herein includes two separate and independent cutting edges 32. This makes the cutting insert 10 indexable within the insert seat 14 of the milling cutter body 12. This, of course, means that once one cutting edge 32 has become worn or dull, the entire cutting insert can be rotated 180 degrees in the insert seat 14 so as to expose the other sharp cutting edge 32.

Figure 4:
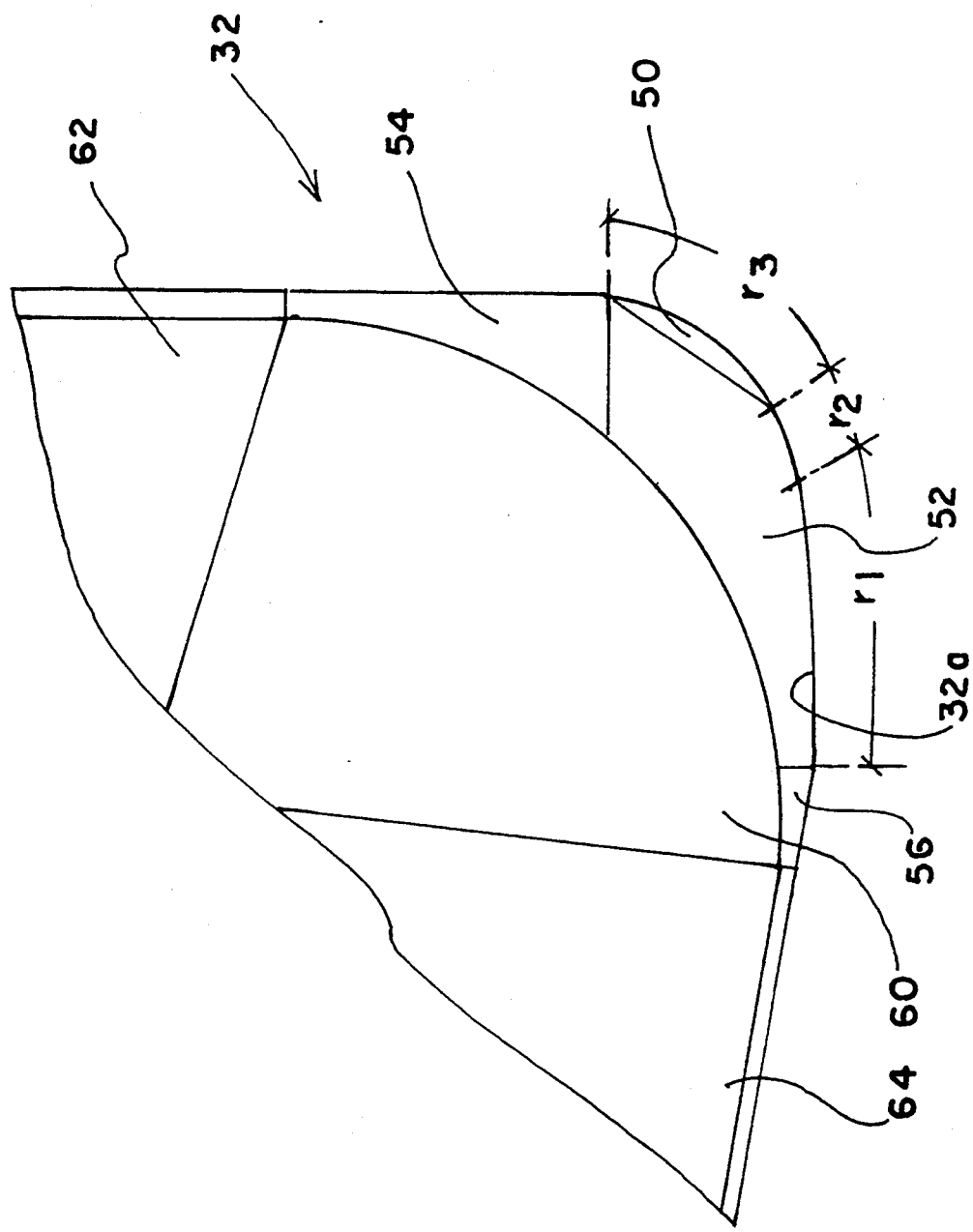
FIG. 4 is a fragmentary top plan view of an elevated corner nose portion of a cutting insert of a second embodiment.

Each cutting edge 32 includes a curved cutting edge segment 32a that essentially extends around the corner or elevated corner nose area 30 of the top face 20 of the insert. From the elevated corner nose area 30, the cutting edge 32 extends downwardly at an incline along a respective side face 24 of the cutting insert 10. In particular, the cutting edge 32 includes a straight segment 32b that extends from a corner area of the insert downwardly along an incline and intersects with the top surface 20 and the side face 24 of the insert 10. While not shown in FIG. 1, it is common to include a land area, the cutting edge 32 an the side face 24 as seen in FIGS. 3 and 4. It should be appreciated that the cutting edge 32 can extend the full length of the respective side face 24 while the curved cutting edge segment 32a terminates on a respective end face 26 just after the same has extended around the elevated corner nose area 30 of the insert.

Now, turning to the elevated corner nose area 30 that is disposed about opposite corners of the top face 20, it is seen that this area includes an angled chamfer 50. Chamfer 50 includes a leading edge that is formed by the curved cutting edge segment 32a around the elevated corner nose area 30. As seen in the drawings, chamfer 50 is angled slightly upwardly from the curved cutting edge segment 32a. This angled orientation of the chamfer 50 distributes cutting forces about the cutting insert 10 and thereby effectively imparts strength to the overall cutting insert 10.

Disposed adjacent to the angled chamfer 50 and situated generally inwardly of the chamfer 50 is a generally flat and elevated surface 52. Flat surface 52 assumes the highest elevation on the top surface 20 of the cutting insert 10. As seen in the drawings, flat surface 52 joins the angled chamfer 50. In the case of the embodiment disclosed, chamfer 50 is angled downwardly at an angle of approximately 7 to 15 degrees with respect to the flat surface 52.

Extending from the flat surface 52 is a pair of tapered lands 54 and 56. Each tapered land 54, 56 joins an inward boundary segment of the flat surface 52 and then extends toward an adjacent side face 24 or end face 26. In particular, in the present case, tapered land 54 extends from the flat surface 52 to a portion of the cutting edge 32 that extends along the side face 24. The other tapered land 56 extends from the flat surface 52 and intersects with the curved cutting edge segment 32a.

Therefore, it is appreciated that the elevated corner nose area 30 formed about opposed corners of the top surface 20 basically comprise the angled chamfer 50, flat surface 52, and the pair of tapered lands 54 and 56.

As seen in FIG. 3 of the drawings, the flat surface 52 borders the cutting edge 32. The segment of the cutting edge 32 that borders the flat surface 52 is composed of two separate but connected radii, $r_1$ and $r_2$. Moreover, the segment of the cutting edge 32 surrounding the chamfer 50 is of a third radii $r_3$. Thus, the segment or portion of the cutting edge 32 extending around the chamfer 50 and the flat surface 52 comprise three different and distinct radii, $r_1$, $r_2$ and $r_3$. In operation, the cutting edge 32 portion having radius $r_3$ engages the side of a workpiece and begins to remove material to define the side and bottom of, for example, a slot. The cutting edge 32b defines the remaining side of a slot while the cutting edge 32a associated with $r_2$ and $r_3$ define the remaining bottom of the slot. By design, the value of radius $r_1$ is greater than radius $r_2$ and radius $r_2$ is greater than radius $r_3$. As an example, the value of $r_1$, for an insert having a length of 0.394 inches and a width of 0.260 inches, may be approximately 0.08 inches and the radius $r_3$ may be approximately 0.03 inches. As a result, the relatively large radius $r_1$ provides an improved surface finish to the bottom of the slot. Furthermore, the cutting edge 32 is blended such that there is a smooth transition at the cutting edge 32 between the sections having the three radii. In this manner, sharp corners are eliminated and the insert corner is strengthened.

As seen in the drawings, the top face 20 between the elevated corner nose areas 30 and the cutting edge 32 is inclined downwardly toward the raised collar 29 around the central opening 28 formed in the cutting insert. In particular, the top face 20 includes a series of distinct surfaces that are inclined downwardly from the cutting edge 32. In this regard, and with reference to FIG. 2, it is seen that on opposite sides of the cutting insert 10 there are a series of top face surfaces that are inclined downwardly towards the central opening 28. In particular, the top surface 20 includes inclined intermediate top surfaces 60, 62 and 64. Intermediate surface 60 joins the tapered lands 54 and 56 and extends downwardly to an intermediate point between the cutting edge 32 and the raised collar 29. The other two intermediate surfaces 62 and 64 extend from the upper edge of the side and end faces 24 and 26 downwardly from the cutting edge 32. Because of the symmetrical nature of the cutting insert 10, it is seen that these intermediate surfaces 60, 62 and 64 appear on each half diagonal section of the cutting insert 10.

Finally, a pair of top corner surfaces 66 are dispersed between the two intermediate surfaces 62 and 64 and inclined downwardly from the cutting edge 32.

FIG. 4 shows a second design for the elevated corner nose portion 30 of the cutting insert 10. It is seen that the design of the cutting insert shown in FIG. 4 is similar to that shown in FIG. 3 but the shape and size of the flat surface 52, angled chamfer 50 and tapered lands 54, 56 have been slightly varied from that shown in FIG. 3. It is noted that the design shown in FIG. 4 does provide for dual radii $r_1$ and $r_2$ about the outer edge of the flat surface 52 that intersects the cutting edge 32. Also, the outer edge of the angled chamfer 50 intersects the cutting edge 32 and includes a third distinct radius $r_3$. Therefore, as seen in FIG. 4, the cutting edge 32 about the flat surface 52 and angled chamfer 50 includes three different and distinct radii $r_1$, $r_2$ and $r_3$. The relationship o these radii is similar to that discussed with FIG. 3.

From the foregoing specification and discussion, it is appreciated that the geometry and top face topography of the cutting insert 10 of the present invention is designed to reduce power consumption during a milling operation and at the same time, to reduce cutting forces on the cutting insert 10 as a whole and to consequentially increase the life of the cutting insert.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A cutting insert comprising:
   a) a main body having a top face, bottom face, and at least a pair of side and end faces therebetween;
   b) at least one elevated corner nose formed on the top surface;
   c) a cutting edge formed around the elevated corner nose and inclined downwardly therefrom along an adjacent side face of the main body;

d) an angled chamfer formed on the corner nose and extending generally upwardly from the cutting edge;

e) a generally flat surface disposed adjacent to and inwardly of the angle chamfer;

f) a pair of separate tapered lands extending from the flat surface and intersecting with the cutting edge on opposite sides of the angled chamfer; and g) wherein the top face includes a central area and an intermediate inclined area that extends between the central area and the cutting edge and the adjacent elevated corner nose area of the top face, and wherein the intermediate area of the top face inclines downwardly from the cutting edge and elevated corner nose to the central area of the top face.

2. The cutting insert of claim 1 including two separate cutting edges and two diagonally opposed elevated corner noses that form an indexable cutting insert.

3. The cutting insert of claim 1 wherein the chamfer is angled downwardly at an angle of approximately 7 to 15 degrees with respect to the flat surface.

4. The cutting insert of claim 3 wherein the flat surface is generally parallel with the bottom face of the main body of the cutting insert.

5. The cutting insert of claim 1 wherein the generally flat surface includes an edge that intersects the cutting edge.

6. The cutting insert of claim 5 wherein the edge of the generally flat surface that intersects the cutting edge includes two distinct radii.

7. The cutting insert of claim 6 wherein the angled chamfer includes an outer edge that intersects the cutting edge.

8. The cutting insert of claim 7 wherein the outer edge of the angled chamfer that intersects the cutting edge joins the edge of the generally flat surface that also intersects the cutting edge.

9. The cutting insert of claim 8 wherein the edge of the angled chamfer that intersects the cutting edge includes a third distinct radius such that the cutting edge that extends around the generally flat surface and the angled chamfer comprises three separate and distinct radii.

10. A cutting insert for a milling cutter comprising:

a) a main body having a top face, a bottom face, and at least a pair of side faces;

b) the top face having a central area and at least one elevated corner nose area;

c) a cutting edge curved around the elevated corner nose area and inclined downwardly from the corner nose area along an adjacent side face of the main body;

d) an angled chamfer formed on the corner nose and inclined upwardly from the curved cutting edge that extends around the corner nose;

e) a flat surface, generally parallel with the bottom face, joining the angled chamfer and extending generally inwardly therefrom to form a flat topography on the corner nose area of the face;

f) a first tapered land joining the flat surface at one boundary area and extending therefrom towards one face side of the cutting insert where the first tapered landing intersects with the cutting edge;

g) a second tapered land joining the flat surface at the second boundary area and extending therefrom towards a second side face of the cutting insert where the second tapered land intersects with the cutting edge; and h) wherein the top face of the cutting insert is inclined generally downwardly from the elevated corner nose area to the central area of the top face.

11. The cutting insert of claim 10 wherein the chamfer, flat surface, and first and second tapered lands are all contiguous and form at least a part of the elevated corner nose area of the top face.

12. The cutting insert of claim 10 wherein the flat surface is generally disposed inwardly of the chamfer but includes an outer edge that intersects with the cutting edge between the chamfer and a respective tapered landing.

13. The cutting insert of claim 10 wherein the chamfer is angled downwardly at an angle of approximately 7 to 15 degrees with respect to the flat surface.

14. The cutting insert of claim 13 wherein the cutting edge curves around the angled chamfer and forms the leading edge thereof.

15. The cutting insert of claim 12 wherein the outer edge of the generally flat surface that intersects with the cutting edge includes at least two distinct radii.

16. The cutting insert of claim 15 wherein the angled chamfer includes an outer edge that intersects with the cutting edge and wherein the outer edge of the chamfer that intersects with the cutting edge includes a third distinct radii such that the cutting edge extending around the generally flat surface and the angled chamfer includes at least three separate and distinct radii.

* * * * *